(12) United States Patent
Duan et al.

(10) Patent No.: US 12,309,086 B2
(45) Date of Patent: May 20, 2025

(54) ENERGY SAVING RF SENSING IN A COMMUNICATION NETWORK

(71) Applicant: QUALCOMM Incorporated, San Diego, CA (US)

(72) Inventors: Weimin Duan, San Diego, CA (US); Hung Dinh Ly, San Diego, CA (US); Hyojin Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 498 days.

(21) Appl. No.: 17/823,070

(22) Filed: Aug. 29, 2022

(65) Prior Publication Data

US 2024/0072958 A1 Feb. 29, 2024

(51) Int. Cl.
| | |
|---|---|
| *H04L 5/00* | (2006.01) |
| *G01S 5/06* | (2006.01) |
| *G01S 13/04* | (2006.01) |
| *H04W 64/00* | (2009.01) |

(52) U.S. Cl.
CPC .............. *H04L 5/0048* (2013.01); *G01S 5/06* (2013.01); *G01S 13/04* (2013.01); *H04W 64/00* (2013.01)

(58) Field of Classification Search
CPC ......... H04L 5/0048; G01S 5/06; G01S 13/04; H04W 64/00
See application file for complete search history.

(56) References Cited

U.S. PATENT DOCUMENTS

2024/0205719 A1* 6/2024 Chong ................. H04W 24/10

FOREIGN PATENT DOCUMENTS

| WO | 2022031856 A1 | 2/2022 |
|---|---|---|
| WO | 2022077356 A1 | 4/2022 |

OTHER PUBLICATIONS

International Search Report and Written Opinion—PCT/US2023/070373—ISA/EPO—Oct. 19, 2023.

* cited by examiner

*Primary Examiner* — Curtis B Odom
(74) *Attorney, Agent, or Firm* — Weaver Austin Villeneuve & Sampson LLP/QUALCOMM

(57) ABSTRACT

In some implementations, a base station may send, to a user equipment (UE), a message indicating that an RF sensing signal is to be used for the RF sensing, wherein the message indicates: the RF sensing signal comprises a modified synchronization signal block (SSB) for supporting both sensing and initial access/mobility, or the RF sensing signal comprises a non-SSB sensing reference signal (S-RS) of a secondary cell (Scell) and has a quasi co-location (QCL) relationship with a root SSB of a primary cell (Pcell). The base station also may transmit the RF sensing signal.

30 Claims, 12 Drawing Sheets

ENERGY SAVING RF SENSING IN A COMMUNICATION NETWORK

BACKGROUND

1. Field of Disclosure

The present disclosure relates generally to the field of radiofrequency (RF)-based sensing, or simply "RF sensing." More specifically, the present disclosure relates to RF sensing in a cellular network.

2. Description of Related Art

As the sophistication of cellular networks such as fourth-generation (4G) and fifth-generation (5G) cellular networks continues to increase, the functionality of such networks expands beyond mere data communication. Cellular networks can, for example, provide positioning functionality to determine a geographical location of a cellular mobile device (known as a "user equipment" (UE)) within a coverage region of the cellular network. Further, such networks are expanding into RF sensing to be able to detect the objects (including their location and speed) from reflections (or echoes) of RF signals off of the objects. Often however, signals are often not able to facilitate both communications and RF sensing. Having different signals for RF sensing than for communications may result in less-than-optimal energy usage

BRIEF SUMMARY

An example method at a base station of enabling radiofrequency (RF) sensing in a wireless communication network, according to this disclosure, may comprise sending, from the base station to a user equipment (UE), a message indicating that an RF sensing signal is to be used for the RF sensing, wherein the message indicates the RF sensing signal comprises a modified synchronization signal block (SSB) for supporting both sensing and initial access/mobility, or the RF sensing signal comprises a non-SSB sensing reference signal (S-RS) of a secondary cell (Scell) and has a quasi co-location (QCL) relationship with a root SSB of a primary cell (Pcell). The method also may comprise transmitting the RF sensing signal.

An example method at a user equipment (UE) of enabling radiofrequency (RF) sensing in a wireless communication network, according to this disclosure, may comprise receiving, at the UE from a base station, a message indicating that an RF sensing signal is to be used for the RF sensing, wherein the message indicates the RF sensing signal comprises a modified synchronization signal block (SSB) for supporting both sensing and initial access/mobility, or the RF sensing signal comprises a non-SSB sensing reference signal (S-RS) of a secondary cell (Scell) and has a quasi co-location (QCL) relationship with a root SSB of a primary cell (Pcell). The method also may comprise performing a measurement of the RF sensing signal.

An example base station for enabling radiofrequency (RF) sensing in a wireless communication network, according to this disclosure, may comprise a transceiver, a memory, one or more processors communicatively coupled with the transceiver and the memory, wherein the one or more processors are configured to send, via the transceiver to a user equipment (UE), a message indicating that an RF sensing signal is to be used for the RF sensing, wherein the message indicates: the RF sensing signal comprises a modified synchronization signal block (SSB) for supporting both sensing and initial access/mobility, or the RF sensing signal comprises a non-SSB sensing reference signal (S-RS) of a secondary cell (Scell) and has a quasi co-location (QCL) relationship with a root SSB of a primary cell (Pcell). The one or more processors further may be configured to transmit the RF sensing signal via the transceiver.

An example user equipment (UE) for enabling radiofrequency (RF) sensing in a wireless communication network, according to this disclosure, may comprise a transceiver, a memory, one or more processors communicatively coupled with the transceiver and the memory, wherein the one or more processors are configured to receive, via the transceiver from a base station, a message indicating that an RF sensing signal is to be used for the RF sensing, wherein the message indicates: the RF sensing signal comprises a modified synchronization signal block (SSB) for supporting both sensing and initial access/mobility, or the RF sensing signal comprises a non-SSB sensing reference signal (S-RS) of a secondary cell (Scell) and has a quasi co-location (QCL) relationship with a root SSB of a primary cell (Pcell). The one or more processors further may be configured to perform a measurement of the RF sensing signal.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
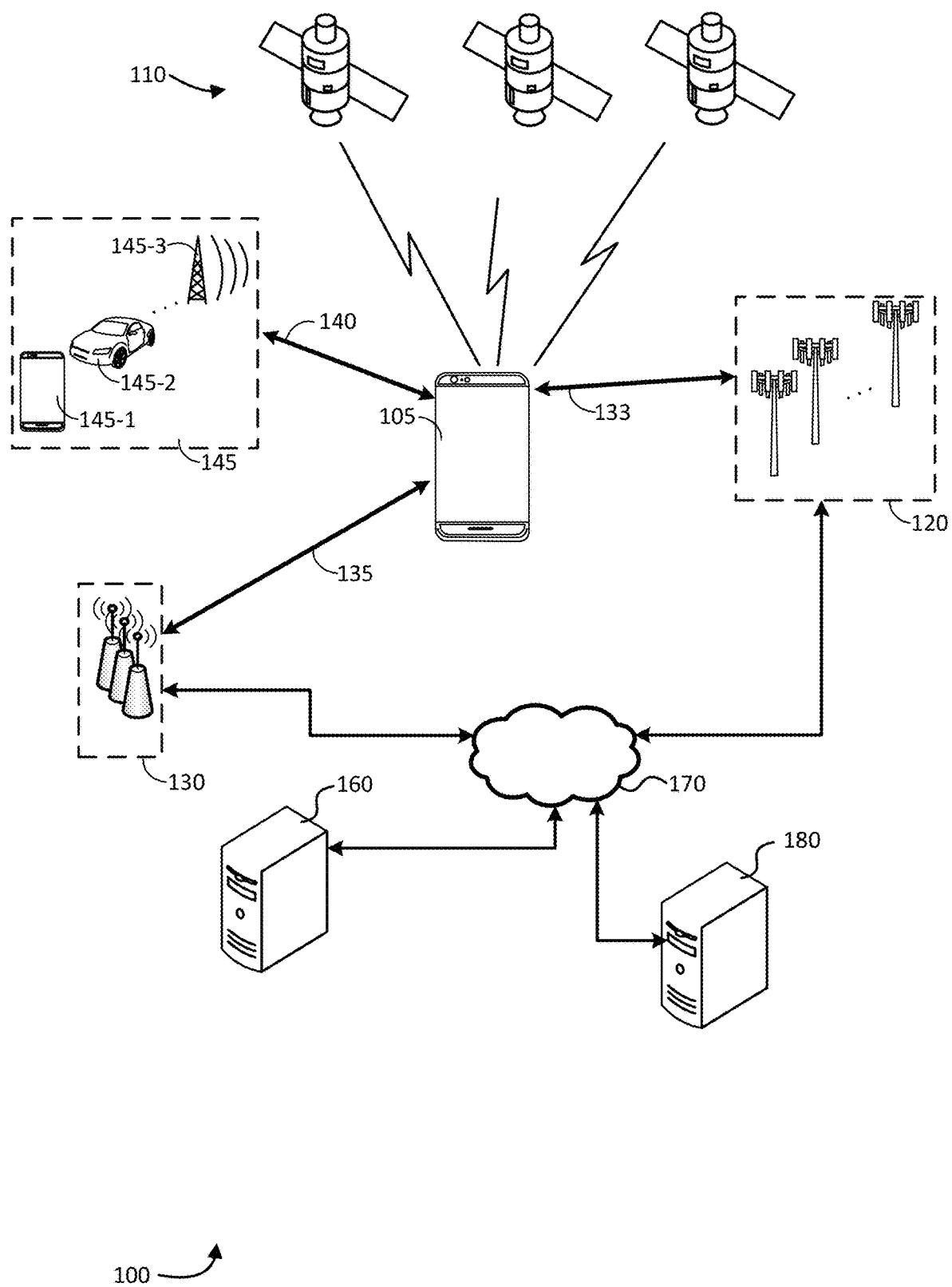
FIG. 1 is an illustration of a communication and positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

As previously noted, RF sensing is being contemplated for use in cellular networks, however using different signals for communication and RF sensing can increase energy usage by the network. According to embodiments herein, a synchronization signal block (SSB) can be modified to accommodate both traditional communication functionality (initial access/mobility) as well as RF sensing (e.g., for coarse target area detection before accurate range and velocity detection is performed using other signals). Such a modified SSB can be selectively used when RF sensing is desired. Additionally or alternatively, in configurations utilizing SSB-less carriers (e.g., for carrier aggregation), a QCL relationship may be established between an SSB of a SSB carrier (e.g., primary cell) and a sensing reference signal (S-RS) of the SSB-less carrier to enable RF sensing by the S-RS. Additional details will be provided after a review of applicable technology.

FIG. 1 is a simplified illustration of a communication and positioning system 100 in which a UE 105, location server 160, and/or other components of the communication and positioning system 100 can use the techniques provided herein for energy saving for RF sensing, according to an embodiment. (That said, embodiments are not necessarily limited to such a system.) The techniques described herein may be implemented by one or more components of the communication and positioning system 100. The communication and positioning system 100 can include: a UE 105; one or more satellites 110 (also referred to as space vehicles (SVs)), which may include Global Navigation Satellite System (GNSS) satellites (e.g., satellites of the Global Positioning System (GPS), GLONASS, Galileo, Beidou, etc.) and or Non-Terrestrial Network (NTN) satellites; base stations 120; access points (APs) 130; location server 160; network 170; and external client 180. Generally put, the communication and positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additionally, wireless devices such as the UE 105, base stations 120, and satellites 110 (and/or other NTN platforms, which may be implemented on airplanes, drones, balloons, etc.) can be utilized for RF sensing.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the communication and positioning system 100. Similarly, the communication and positioning system 100 may include a larger or smaller number of base stations 120 and/or APs 130 than illustrated in FIG. 1. The illustrated connections that connect the various components in the communication and positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). According to aspects of applicable 5G cellular standards, a base station 120 (e.g., gNB) may be capable of transmitting different "beams" in different directions, and performing "beam sweeping" in which a signal is transmitted in different beams, along different directions (e.g., one after the other). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

Satellites 110 may be utilized for positioning in communication in one or more way. For example, satellites 110 (also referred to as space vehicles (SVs)) may be part of a Global Navigation Satellite System (GNSS) such as the Global Positioning System (GPS), GLONASS, Galileo or Beidou. Positioning using RF signals from GNSS satellites may comprise measuring multiple GNSS signals at a GNSS receiver of the UE 105 to perform code-based and/or carrier-based positioning, which can be highly accurate. Additionally or alternatively, satellites 110 may be utilized for NTN-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations 120, and may be coordinated by a location server 160. In some embodiments, satellites 110 used for NTN-based positioning may be different than those used for GNSS-based positioning. In some embodiments NTN notes may include non-terrestrial vehicles such as airplanes, balloons, drones, etc., which may be in addition or as an alternative to NTN satellites. NTN satellites 110 and/or other NTN platforms may be further leveraged to perform RF sensing. As described in more detail hereafter, satellites may use a JCS symbol in an OFDM waveform to allow both RF sensing and communication.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the UE 105, or a combination thereof. Wireless signals from mobile devices 145 used for positioning of the UE 105 may comprise RF signals using, for example, Bluetooth® (including Bluetooth Low Energy (BLE)), IEEE 802.11x (e.g., Wi-Fi®), Ultra Wideband (UWB), IEEE 802.15x, or a combination thereof. Mobile devices 145 may additionally or alternatively use non-RF wireless signals for positioning of the UE 105, such as infrared signals or other optical technologies.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of a mobile device 145 (e.g., another UE) at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
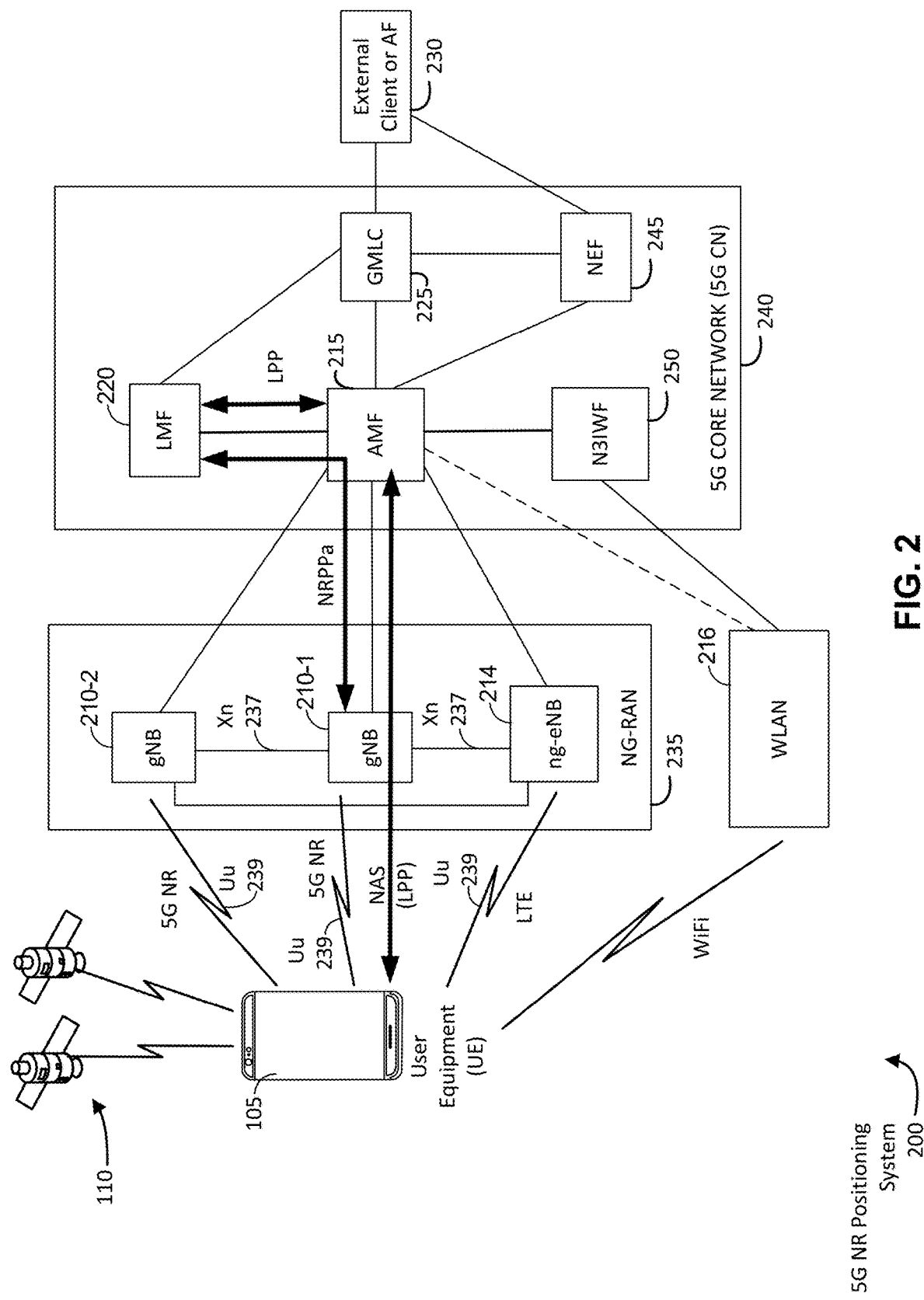
FIG. 2 is a diagram of a 5G new radio (NR) positioning system, according to an embodiment.

As previously noted, the example communication and positioning system 100 can be implemented using a wireless communication network, such as an LTE-based or 5G NR-based network, or a future 6G network. FIG. 2 shows a diagram of a 5G NR communication and positioning system 200, illustrating an embodiment of a positioning system (e.g., communication and positioning system 100) implementing 5G NR. The 5G NR communication and positioning system 200 may be configured to determine the location of a UE 105 by using access nodes, which may include NR NodeB (gNB) 210-1 and 210-2 (collectively and generically referred to herein as gNBs 210), ng-eNB 214, and/or WLAN 216 to implement one or more positioning methods. The gNBs 210 and/or the ng-eNB 214 may correspond with base stations 120 of FIG. 1, and the WLAN 216 may correspond with one or more access points 130 of FIG. 1. Optionally, the 5G NR communication and positioning system 200 additionally may be configured to determine the location of a UE 105 by using an LMF 220 (which may correspond with location server 160) to implement the one or more positioning methods. Here, the 5G NR communication and positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. Additional components of the 5G NR communication and positioning system 200 are described below. The 5G NR communication and positioning system 200 may include additional or alternative components.

The 5G NR communication and positioning system 200 may further utilize information from satellites 110. As previously indicated, satellites 110 may comprise GNSS satellites from a GNSS system like Global Positioning System (GPS) or similar system (e.g. GLONASS, Galileo, Beidou, Indian Regional Navigational Satellite System (IRNSS)). Additionally or alternatively, satellites 110 may comprise NTN satellites that may be communicatively coupled with the LMF 220 and may operatively function as a TRP (or TP) in the NG-RAN 235. As such, satellites 110 may be in communication with one or more gNB 210.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR communication and positioning system 200. Similarly, the 5G NR communication and positioning system 200 may include a larger (or smaller) number of satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR communication and positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1)

may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR communication and positioning system 200, such as the LMF 220 and AMF 215.

5G NR communication and positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to SGCN 240 may occur if WLAN 216 is a trusted WLAN for SGCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. As noted, this can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR communication and positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to SGCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node (e.g., gNB 210, ng-eNB 214, or WLAN 216) of a first RAT to an access node of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Frequency Difference Of Arrival (FDOA), Real Time Kinematic (RTK), Precise Point Positioning (PPP), Differential GNSS (DGNSS), Enhanced Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as SGCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in SGCN 240. The NEF 245 may support secure exposure of capabilities and events concerning SGCN 240 and UE 105 to the external client 230, which may then be referred to as an Access Function (AF) and may enable secure provision of information from external client 230 to SGCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

Figure 3:
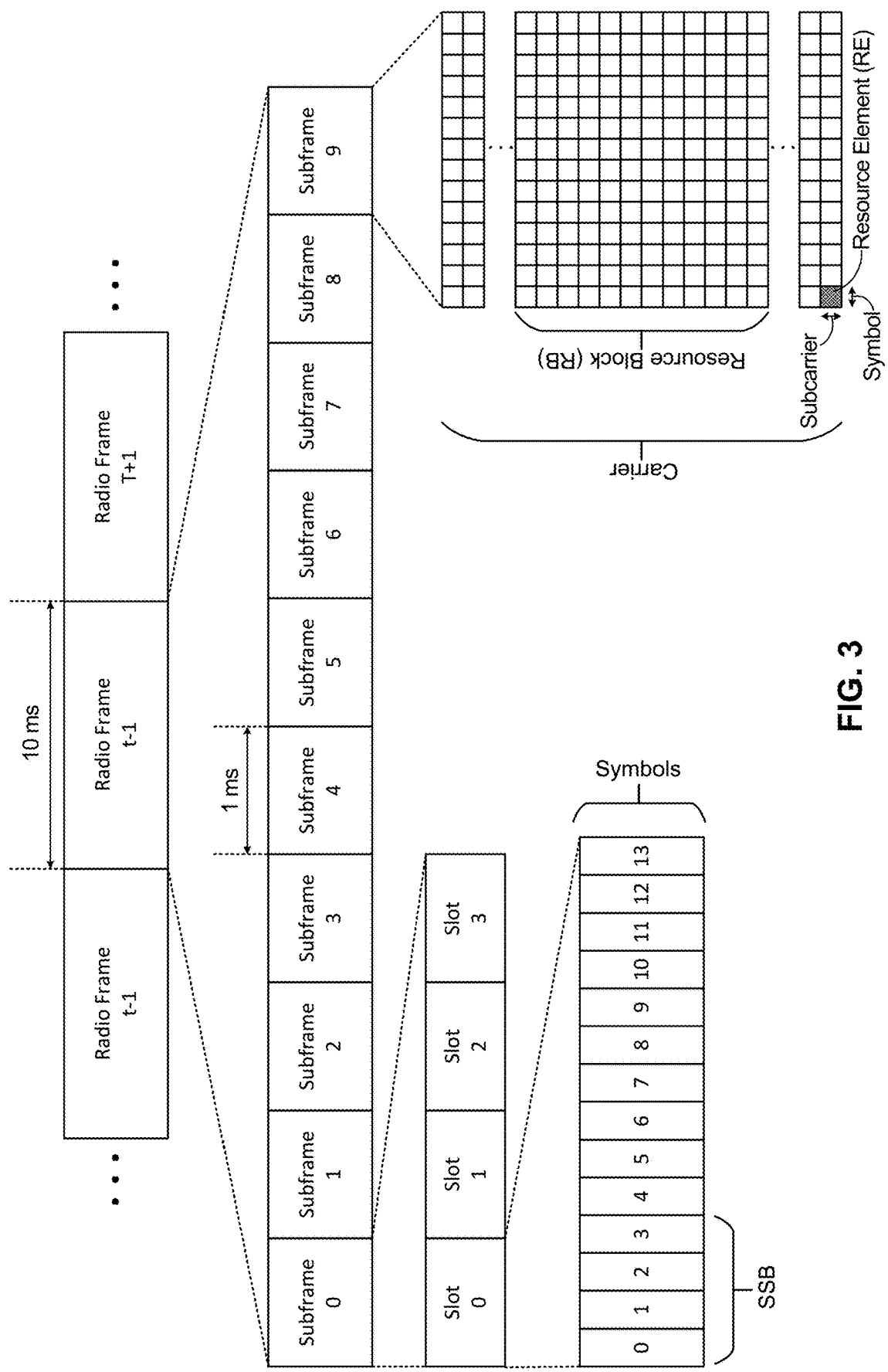
FIG. 3 is a diagram showing an example of a frame structure for NR, according to an embodiment.

FIG. 3 is a diagram showing an example of a frame structure for NR and associated terminology, which can serve as the basis for physical layer communication between a UE and base stations/TRPs. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini slot may comprise a sub slot structure (e.g., 2, 3, or 3 symbols). Additionally shown in FIG. 3 is the complete Orthogonal Frequency-Division Multiplexing (OFDM) of a subframe, showing how a subframe can be divided across both time and frequency into a plurality of Resource Blocks (RBs). A single RB can comprise a grid of Resource Elements (REs) spanning 14 symbols and 12 subcarriers.

Figure 4:
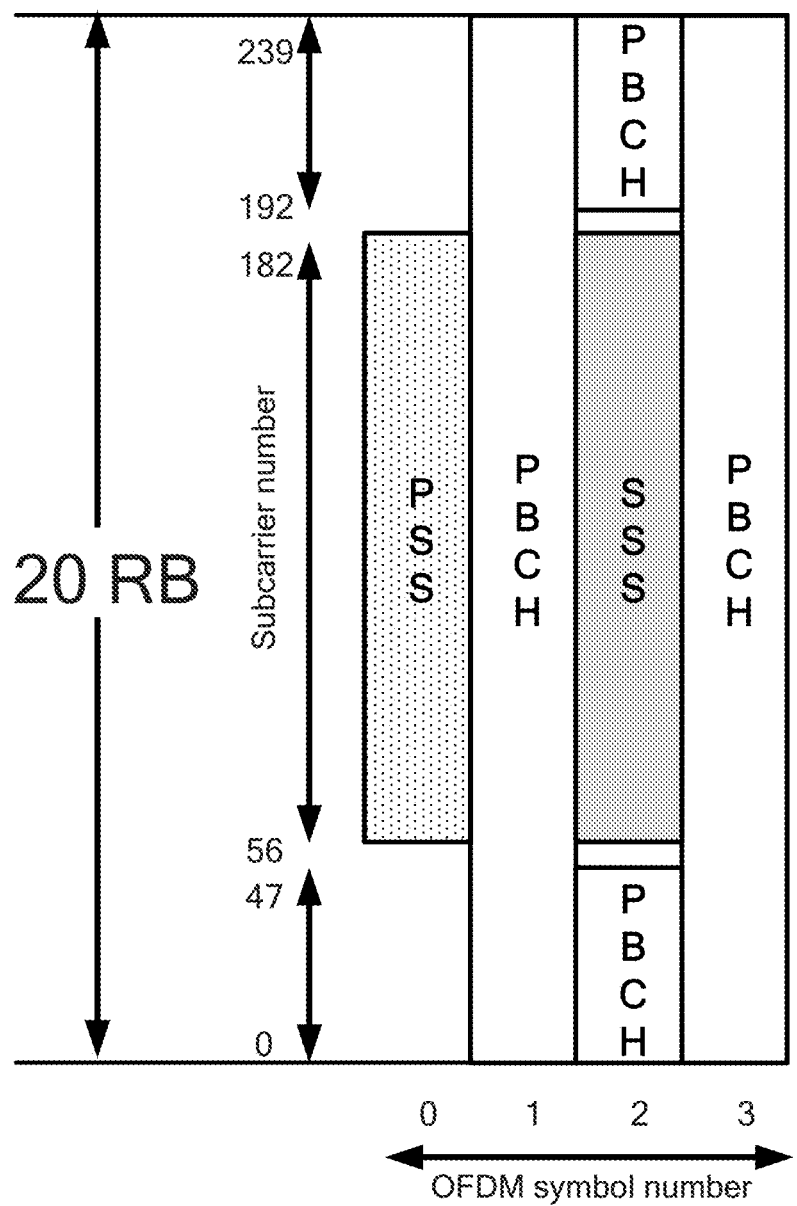
FIG. 4 is a diagram of a block structure of a synchronization signal block (SSB), according to an embodiment.

Each symbol in a slot may be associated with a link direction (e.g., downlink (DL), uplink (UL), or flexible) or data transmission and the link direction for each subframe may be dynamically switched. The link directions may be based on the slot format. Each slot may include DL/UL data as well as DL/UL control information. In NR, a synchronization signal (SS) block is transmitted to provide OFDM synchronization and physical cell ID. The SS block, or SSB, can include a primary SS (PSS), a secondary SS (SSS), and a Physical Broadcast Channel (PBCH). The SS block can be transmitted in a fixed slot location, such as the symbols 0-3 as shown in FIG. 4. The PSS and SSS may be used by UEs for cell search and acquisition. The PSS may provide half-frame timing, the SS may provide the cyclic prefix (CP) length and frame timing. The PBCH carries some basic system information, such as downlink system bandwidth, timing information within radio frame, SS burst set periodicity, system frame number, etc. which may be included in a master information block (MIB). An SS burst set comprises a set of SSBs in which each SSB potentially may be transmitted on a different beam (e.g., during a beam sweep). The SSB may be transmitted in the first symbols of a slot, as shown in FIG. 3.

FIG. 4 is a diagram of the block structure of an SSB (SS/PBCH block). With regard to frequency, the SSB may span 20 RBs in frequency (240 subcarriers), with the PSS and SSS centered in the frequency blocks spanned by the SSB. With regard to time, the SSB may span four consecutive OFDM symbols: PSS and SSS may occur at symbols 0 and 2, respectively, and PBCH may occur at OFDM symbols 1-3. The SSB may be transmitted at different periodicities; the default periodicity is 20 ms. Other aspects of the SSB (which may have an impact on RF sensing capabilities) may vary, depending on factors such as center frequency (e.g., 3.5 GHz, 13 GHz, etc.) and/or subcarrier spacing (SCS).

According to embodiments herein, SSBs, which are widely used in a communication system for synchronization and other purposes, also may be used to perform RF sensing for course target area detection before accurate range and velocity detection is performed using other signals. This can be done, for example, in a bistatic configuration, such as when a base station (e.g., gNB) transmits signals that are received by a UE and/or vice versa. Further, in some embodiments, an SS burst set without beam sweeping may be used for velocity detection. The reuse of existing communication SSBs for RF sensing in this manner can result in time and/or power savings over implementations that utilize separate signals to perform course target area detection.

As noted, RF sensing capabilities may vary depending on the center frequency and SCS. Table 1 below provides example sensing capabilities for SCS ($\Delta f$) at 15 kHz and 30 kHz, where the center frequency ($f_c$) is 3.5 GHz.

TABLE 1

| RF Sensing Capabilities for $F_c$ = 3.5 GHZ | | |
|---|---|---|
| $f_c$ | 3.5 GHZ | |
| $\Delta f$ | 15 kHz | 30 kHz |
| $T_g$ | 4.69 µs | 2.34 µs |
| W | 3.6 MHz | 7.2 MHz |
| $T_B$ | 285.4 µs (71.35 × 4) | 142.72 µs (35.68 × 4) |
| $T_S$ | 71.35 µs | 35.68 µs |
| $d_{max} < cT_g/2$ | 703.5 m | 351 m |
| $\Delta d > c/(2W)$ | 41.7 m | 20.8 m |
| $\Delta v > c/(2f_c T_B)$ | 150 m/s | 300 m/s |
| $v_{max} < c\Delta f/(20 f_c)$ | 64 m/s | 129 m/s |

In Table 1, $T_g$ is CP duration, W is BW of the SSB, $T_B$ is the duration of an SSB, and $T_S$ is the OFDM symbol duration.

Table 2 below provides a sensing capabilities similar to Table 1, but for SCS ($\Delta f$) at 120 kHz and 240 kHz, and a center frequency ($f_c$) of 13 GHz.

TABLE 2

| RF Sensing Capabilities for $F_c$ = 13 GHz | | |
|---|---|---|
| $f_c$ | 13 GHz | |
| $\Delta f$ | 120 kHz | 240 kHz |
| $T_g$ | 0.59 µs | 0.29 µs |
| W | 28.8 MHz | 57.6 MHz |
| $T_B$ | 35.68 µs (8.92 × 4) | 17.84 µs (4.46 × 4) |
| $T_S$ | 8.92 µs | 4.46 µs |
| fs | 120 kHz | 240 kHz |
| $d_{max} < cT_g/2$ | 87.9 m | 44.0 m |
| $\Delta d > c/(2W)$ | 5.2 m | 2.6 m |
| $\Delta v > c/(2f_c T_B)$ | 323 m/s | 647 m/s |
| $v_{max} < c\Delta f/(20 f_c)$ | 69 m/s | 138 m/s |

It can be noted that, in carrier aggregation (CA), some carriers (e.g., secondary cells, or Scells) may not have SSB transmission and the time/frequency/spatial information is obtained from the anchor carrier (e.g., a primary cell, or Pcell). This feature was introduced in the relevant 3GPP wireless standards (Rel-15) for intra-band CA and now is under discussion for inter-band CA under Rel-18 NW energy savings. However, a cell may ultimately need an SSB to transmit any channel/signal because all channels/signals have a quasi co-location (QCL) ultimately rooted to SSB. Accordingly, according to some embodiments herein, embodiments may leverage QCL configuration for RF sensing in carriers without an SSB (herein, "SSB-less carriers") to enable RF sensing using a reference signal (RS), such as a PRS.

Because SSB is the cell-wise broadcast signal, from network power saving perspective, embodiments may employ a sensing procedure that can start with the SSB-based target detection before sending dense sensing RS for accurate target parameter estimation. To do so, embodiments may define two classes of SSBs, where Class 1 is a traditional or legacy SSB, and Class 2 is an enhanced SSB that may be used to support both RF sensing and initial access/mobility. A Class 2 SSB may be configured to enhance the target detection performance, where (i) each SS burst set may be transmitted without beam sweeping, (ii) multiple SS burst sets could be configured with different beams, (iii) phase continuity may be guaranteed (at least within a SS burst), (iv) a longer burst duration is used (relative to Class 1 SSB) for Doppler estimation, or any combination thereof. Thus, a Class 2 SSB can allow for better RF sensing, including better speed estimation, relative to Class 1 SSB (legacy SSB).

The use of these different classes of SSB may vary, depending on desired functionality. According to one option, a UE may only measure the Class 1 SSB (legacy SSB) by default. However, when the UE intends to perform RF sensing (e.g., alone or with a group of other UEs), the UE may be able to request a Class 2 SSB on-demand from the network to initiate a sensing session. According to another option, a UE may again only measure the Class 1 SSB (legacy SSB), but may be alerted to the transmission of a Class 2 SSB through legacy SSB acquisition. The UE can then decide whether to monitor for the Class 2 SSB. Because Class 1 SSB offer energy savings for a network, the default operation in either option offers energy savings in typical operation. According to these options, Class 2 SSBs may be transmitted as desired to perform RF sensing.

For SSB-less carriers, embodiments may utilize a QCL configuration to utilize an RS for sensing (or positioning). In various aspects of a wireless communication network, including positioning and RF sensing, communicating a QCL relation to a wireless device may enable the wireless device to efficiently determine various wireless characteristics. In particular, a QCL relation indicates whether two signals (or functional channels) share common large-scale wireless properties (e.g., avg. delay, delay spread, Doppler shift, Doppler spread) and/or same RX spatial filter. A QCL "type" may indicate what type of properties are shared. Current QCL types include QCL Type A (average delay, delay spread, Doppler shift, Doppler spread), QCL Type B (Doppler shift, Doppler spread), QCL Type C (Avg. delay, Doppler shift), and QCL Type D (Spatial RX relation). Two signals that share a QCL relation (e.g., of one or more QCL types) can be described as being "QCLed." In a cellular network (e.g., a 5G network), a QCL relation may be indicated using Transmission Configuration Indication (TCI).

Figure 5:
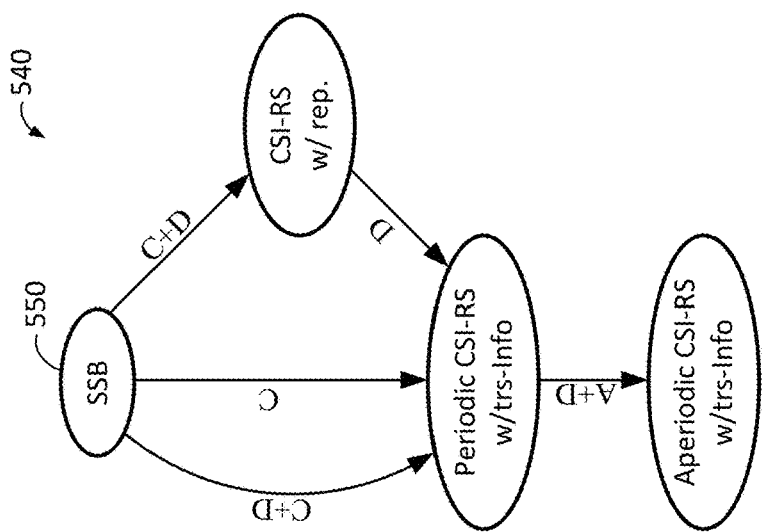
FIG. 5 is an illustration of two diagrams that show quasi co-location (QCL) relationships for downlink (DL) signals, as currently defined in applicable cellular standards.
Figure 5:
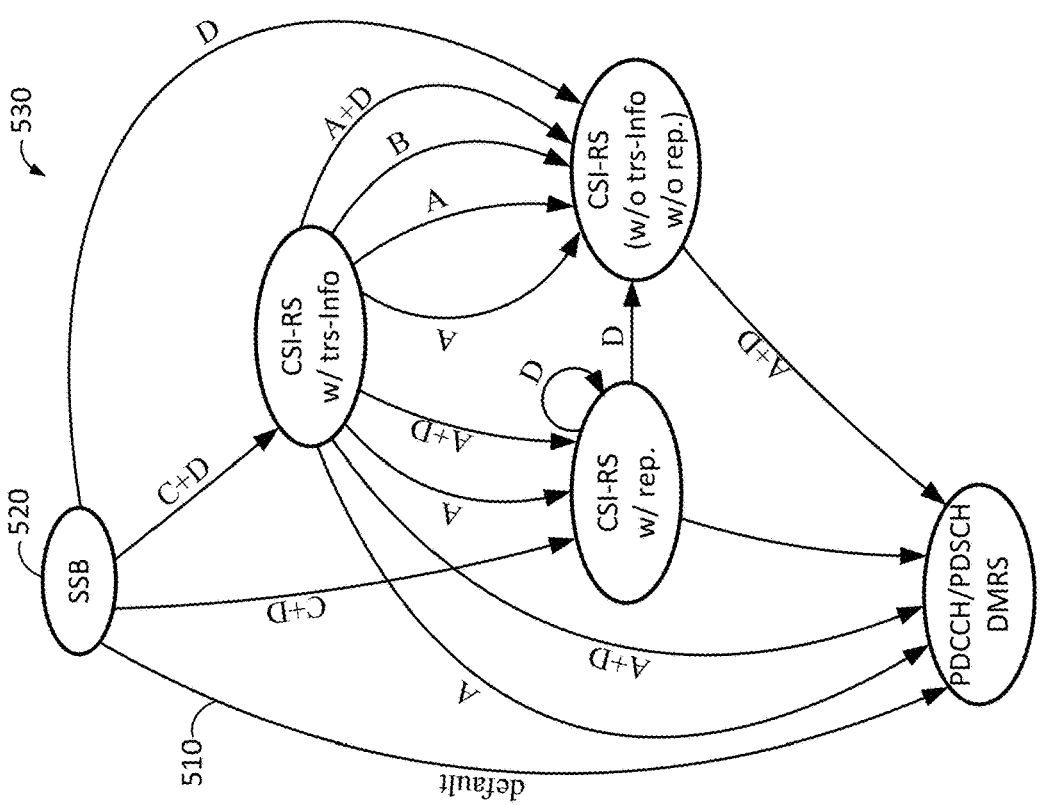

FIG. 5 is an illustration of two diagrams that show QCL relationships for DL signals, as currently defined in applicable cellular (5G) standards. Arrows pointing from one signal type to another indicate a QCL relationship, with the particular type of QCL relationship indicated by the label arrow label. For example, arrow 510 illustrates how SSB 520 can serve as a default QCL reference for Physical Downlink Control Channel (PDCCH), Physical Downlink Shared Channel (PDSCH), and Demodulation Reference Signal (DMRS) signals. In FIG. 5, the first group 530 illustrates how SSB 520 can serve as a QCL reference for various non-SSB signals including PDCCH, PDSCH, DMRS, Channel State Information Reference Signal (CSI-RS) with tracking reference signal (TRS or trs)-Info (which indicates that the antenna port for all non-zero power CSI-RS (NZP-CSI-RS) resources in the CSI-RS resource set is the same), CSI-RS with rep, and CSI RS without trs-Info or repetition ("rep."). The second group 540 shows a similar relationship between SSB 550 and non-SSB signals including CSI-RS with repetition, periodic CSI-RS with trs-Info, and aperiodic CSI-RS with trs-Info. As shown, some non-SSB signals may serve as a QCL for other non-SSB signals. However, QCL relationships for all non-SSB signals in groups 530 and 540 can be traced back to a "root" SSB 520 and 550, respectively.

Figure 6:
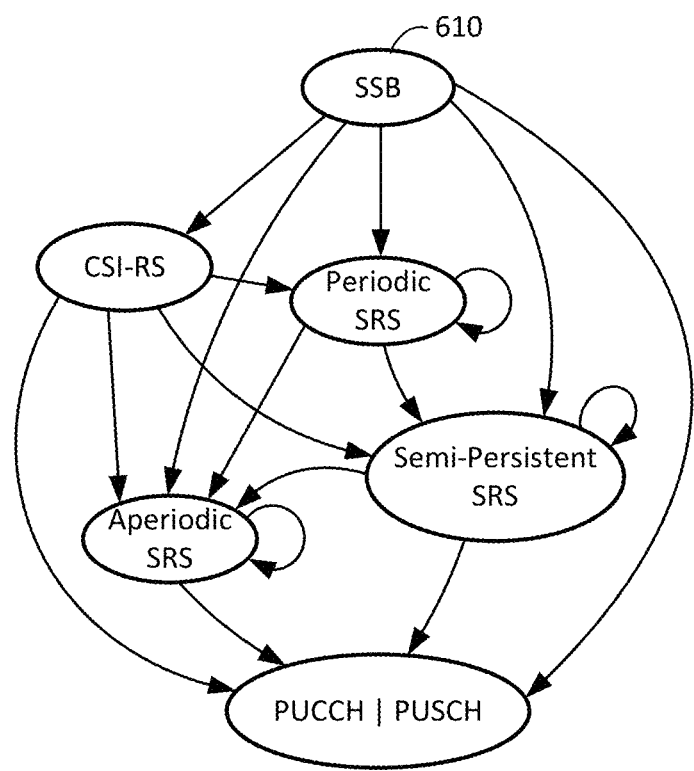
FIG. 6 is an illustration showing QCL relationships for a group of uplink (UL) signals, as currently defined in applicable cellular standards.

FIG. 6 is an illustration, similar to FIG. 5, showing QCL relationships for a group of UL signals. Similar to the groups for DL signals shown in FIG. 5, QCL relationships for non-SSB signals can be traced back to a "root" SSB 610. In this example, the non-SSB signals include CSI-RS, periodic sounding reference signal (SRS), semi-persistent SRS, aperiodic SRS, physical uplink control Channel (PUCCH), and physical uplink shared Channel (PUSCH).

As noted elsewhere herein, a non-SSB RS used for sensing or positioning herein may include any non-SSB illustrated in FIG. 5 (for a DL RS) or FIG. 6 (for a UL RS). That said, embodiments are not necessarily limited to these types of non-SSB RS.

In cases where a wireless node (e.g., a base station or UE) in a wireless communication network utilizes both and SSB carrier (Pcell) and an SSB-less carrier (Scell) (e.g., for carrier aggregation), embodiments may use a QCL configuration to utilize an RS in the SSB-less carrier for sensing or positioning. In such embodiments, an RS may comprise, for example, any of the non-SSB signals illustrated in FIGS. 5 and 6. Additional details regarding how this can be done are described hereafter with regard to FIGS. 7A-7C.

Figure 7A:
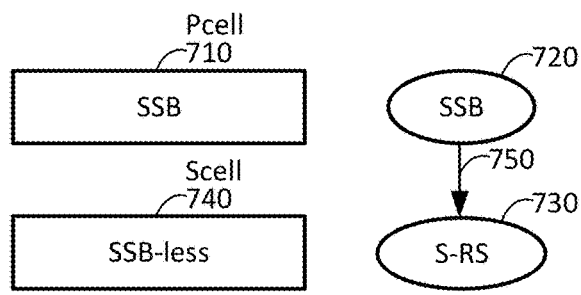
FIGS. 7A-7C are diagrams illustrating how QCL configurations may be utilized for RF sensing using a non-SSB reference signal (RS) in an SSB-less carrier, according to an embodiment.

FIG. 7A is a diagram illustrating how a QCL relationship may be established to enable RF sensing or positioning using an SSB-less carrier, according to some embodiments. Here, a Pcell 710 includes an SSB 720. However, the sensing RS (S-RS) 730 to be used for sensing or positioning is in an Scell 740. Thus, according to this example, the SSB 720 in the Pcell 710 can serve as a QCL reference (illustrated by arrow 750 in a manner similar to FIGS. 5-6) for the S-RS 730. According to some embodiments, the S-RS 730 comprise any of the non-SSB signal types illustrated in FIGS. 5-6.

Figure 7B:
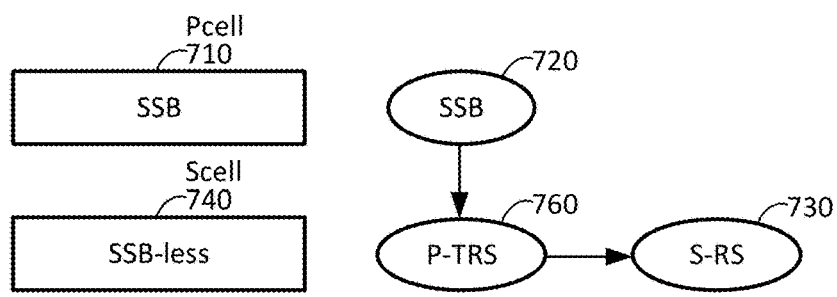

FIG. 7B is a diagram, similar to FIG. 7A, illustrating an alternative implementation that some embodiments may employ. In this implementation, a periodic TRS (P-TRS) 760 in the Scell 740 is used as an intermediary signal (or, put differently, an intermediary QCL reference), acting as a QCL reference to the S-RS 730 while also using the SSB 720 of the Pcell 710 as a QCL reference. It can be noted that, although FIG. 7B illustrates a P-TRS 760 is an intermediary signal, embodiments are not so limited. Other non-SSB signal types (e.g., other CSI-RS) in the Scell 740 may act as an intermediary signal.

Figure 7C:
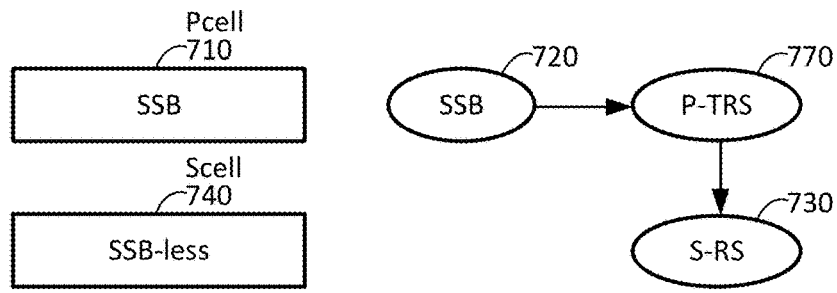

FIG. 7C is a diagram, similar to FIGS. 7A and 7B, illustrating another alternative implementation that some embodiments may employ. Here, rather than use an intermediary signal in the Scell 740, this implementation utilizes an intermediary signal in the Pcell 710. That is, a P-TRS 770 (or other intermediary signal) in the Pcell 710 is used as a QCL reference for the S-RS 730, and also uses the SSB 720 is a QCL reference.

It can be noted that embodiments are not necessarily limited to the embodiments shown in FIGS. 7A-7C. For example, some embodiments may utilize more than one intermediary signal, which may or may not be of the same signal type. Moreover, different intermediary signals may be in different cells. There may be, for example, one or more intermediary signals in the Pcell 710 and/or one or more intermediary signals in the Scell 740.

It can be noted that utilizing the SSB 720 in the Pcell 710 is a QCL reference for a signal in the Scell 740 may be applicable in some circumstances and not others. A QCL relationship may be limited to certain QCL types based on different frequencies used and/or different locations between the Pcell 710 and Scell 740. For example, a QCL reference may be applicable when the Pcell 710 and Scell 740 are co-located (e.g., at the same cellular tower of a base station) to ensure a correlation in channel properties, allowing for a QCL relationship to be established between signals in the Pcell 710 and Scell 740. Moreover, because a wireless channel may change over time, the SSB 720 may serve as a QCL reference (directly or indirectly through an intermediary signal), with respect to at least some QCL types, for the S-RS 730 within a certain threshold of time.

It can be noted that the coordination of the use of SSB and/or non-SSB signals for RF sensing may be coordinated in different ways, depending on desired functionality. According to some embodiments, RF sensing may be coordinated by a server in a wireless network (e.g., server 160 of FIG. 1, or LMF 220 of FIG. 2). In such embodiments, the server may provide a sensing configuration to a base station (e.g., gNB) to perform RF sensing (e.g., via a protocol such as NRPPa). This sensing configuration may include parameters such as a time period in which the RF sensing is to be performed, an area can be sensed by the RF sensing, one or more quality metrics (spatial and/or Doppler resolution, etc.), or the like. In such embodiments, the base station may relay the sensing configuration to the UE.

In some embodiments, the UE and base station may communicate directly (e.g., via radio resource control (RRC), uplink control information (UCI)/downlink control information (DCI), media access control-control element (MAC-CE), etc.). As indicated, a UE may, for example, request a Class 2 SSB from the base station, in which case the base station may send an acknowledgment (ACK) and/or information indicative of when the Class 2 SSB will be transmitted. For embodiments utilizing non-SSB signals for RF sensing, communication between the UE and base station may comprise an indication of the S-RS be used for RF sensing (which may be a DL signal transmitted by the base station or a UL signal transmitted by the UE), and a QCL reference (e.g., an SSB or an intermediary signal), which may further include a QCL type.

The way in which RF sensing measurements reported may also vary, depending on desired functionality. For embodiments in which a server coordinates RF sensing between a base station and UE (which may include DL and/or UL signaling), a receiving device may (e.g., a UE or base station) send measurement information to the server, where the measurement information is obtained from measuring the RF sensing signal (e.g., SSB or S-RS, as described in the embodiments herein). The transmitting device (a base station or UE) may also send information to the server regarding the transmitted signal. The server may then process this information to identify sensed objects, etc. Additionally or alternatively, a receiving device may process the information and relay this information to the server. If no server is involved, a receiving device may process the information to perform the RF sensing, or report measurement information to the transmitting device to enable the transmitting device to perform the RF sensing (e.g., identify sensed objects, etc.).

As a person of ordinary skill in the art will appreciate, alternative embodiments may employ various different combinations of the techniques described herein for transmitting sensing configuration information, reporting measurement information, and/or processing the measurement information.

Figure 8:
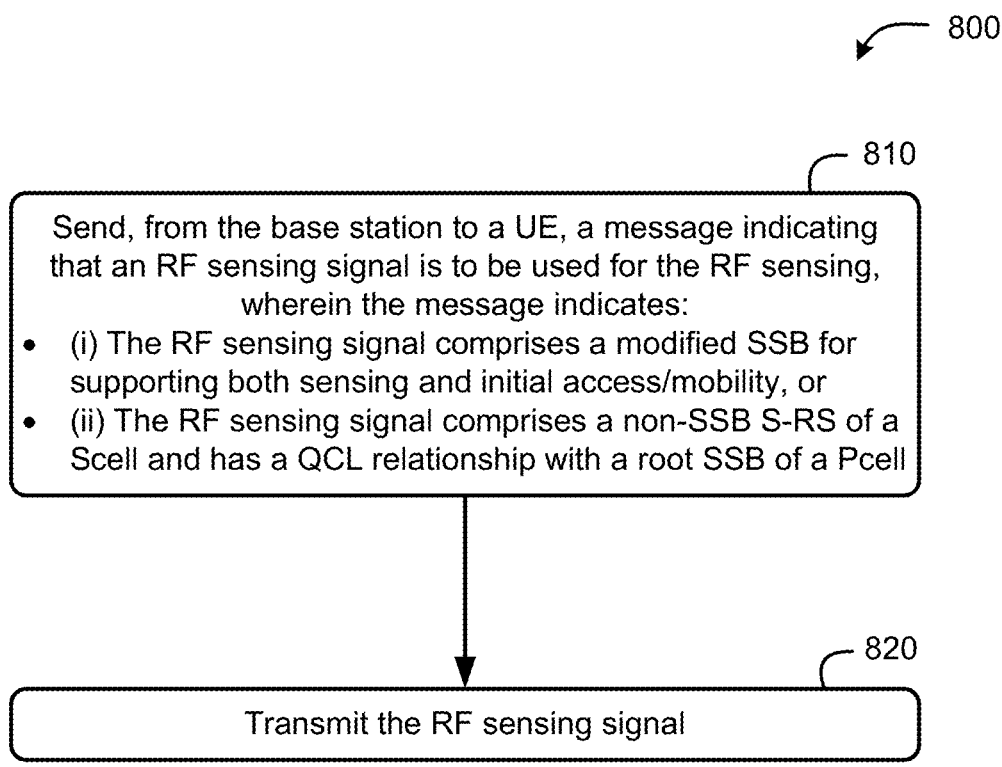
FIG. 8 is a flow diagram of a method at a base station of enabling RF sensing in a wireless communication network, according to an embodiment.

FIG. 8 is a flow diagram of a method at a base station of enabling RF sensing in a wireless communication network, according to an embodiment. Means for performing the functionality illustrated in one or more of the blocks shown in FIG. 8 may be performed by hardware and/or software components of a base station. Example components of a base station are illustrated in FIG. 11, which is described in more detail below.

At block 810, the functionality comprises sending, from the base station to a UE, a message indicating that an RF sensing signal is to be used for the RF sensing, wherein the message indicates (i) of the RF sensing signal comprises a modified SSB for supporting both sensing and initial access/mobility, or (ii) the RF sensing signal comprises a non-SSB S-RS of a Scell and has a QCL relationship with a root SSB of a Pcell. As previously indicated, a modified SSB for supporting both sensing and initial access/mobility may include a Class 2 SSB as previously described herein, where a Class 1 SSB may comprise a traditional (unmodified) SSB. Modifications of a modified SSB may vary, depending on desired functionality. According to some embodiments, the modified SSB may comprise an SS burst set transmitted without beam sweep, a plurality of SS burst sets in which, for each SS burst set, each SSB is transmitted using a different beam, an SS burst set in which phase continuity is guaranteed, or an SS burst set having a longer burst duration (e.g., several tens of ms, or more) than a traditional SS burst set (e.g., 5 ms), or any combination thereof.

Figure 11:
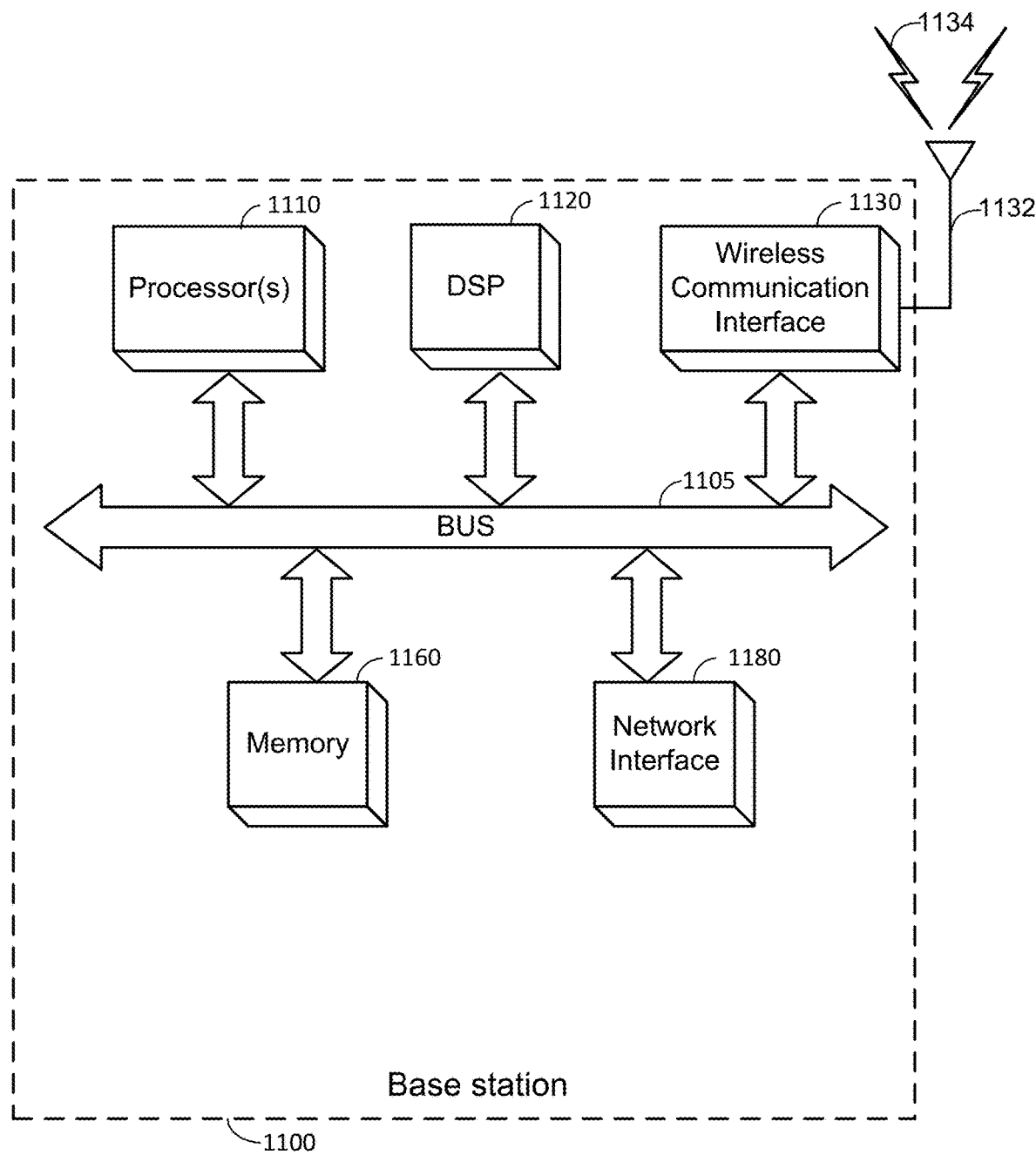
FIG. 11 is a block diagram of an embodiment of a base station.

Means for performing functionality at block 810 may comprise a bus 1105, processors 1110, digital signal processor (DSP) 1120, wireless communication interface 1130, memory 1160, and/or other components of a base station 1100, as illustrated in FIG. 11.

At block 810, the functionality comprises transmitting the RF sensing signal. As previously noted, the transmitting of the RF sensing signal may be responsive to a request from the UE for such a signal (e.g., a modified SSB). As such, according to some embodiments of the method 800, the RF sensing signal may comprise the modified SSB, and sending the RF transmitting signal is responsive to receiving, at the base station from the UE, a request for the modified SSB. Additionally or alternatively, the sending of the RF sensing signal may be triggered by a request and/or sensing configuration received from a server. As noted, in such embodiments, the base station may further provide information to the server about the RF sensing signal (e.g., timing, power, and/or other parameters) to enable the server to perform the RF sensing based on measurements provided by the UE.

Means for performing functionality at block 820 may comprise a bus 1105, processors 1110, DSP 1120, wireless communication interface 1130, memory 1160, and/or other components of a base station 1100, as illustrated in FIG. 11.

As detailed elsewhere herein, embodiments may include one or more additional features, depending on desired functionality. As noted in the diagrams of FIGS. 7A-7C, in cases where an S-RS is utilized in an SSB-less carrier, a QCL relationship between the S-RS and the root SSB may be direct (e.g., as shown in FIG. 7A) or indirect (e.g., via an intermediary signal, as shown in FIGS. 7B and 7C). Accordingly, for embodiments of the method 800 in which the RF sensing signal comprises the S-RS, the QCL relationship with the root SSB may comprise a QCL relationship with at least one intermediary signal having a QCL relationship with the root SSB. According to some embodiments, the at least one intermediary signal may comprise a periodic tracking reference signal (P-TRS). Additionally or alternatively, the at least one intermediary signal comprises a signal of the Pcell a signal of the Scell, or both.

Figure 9:
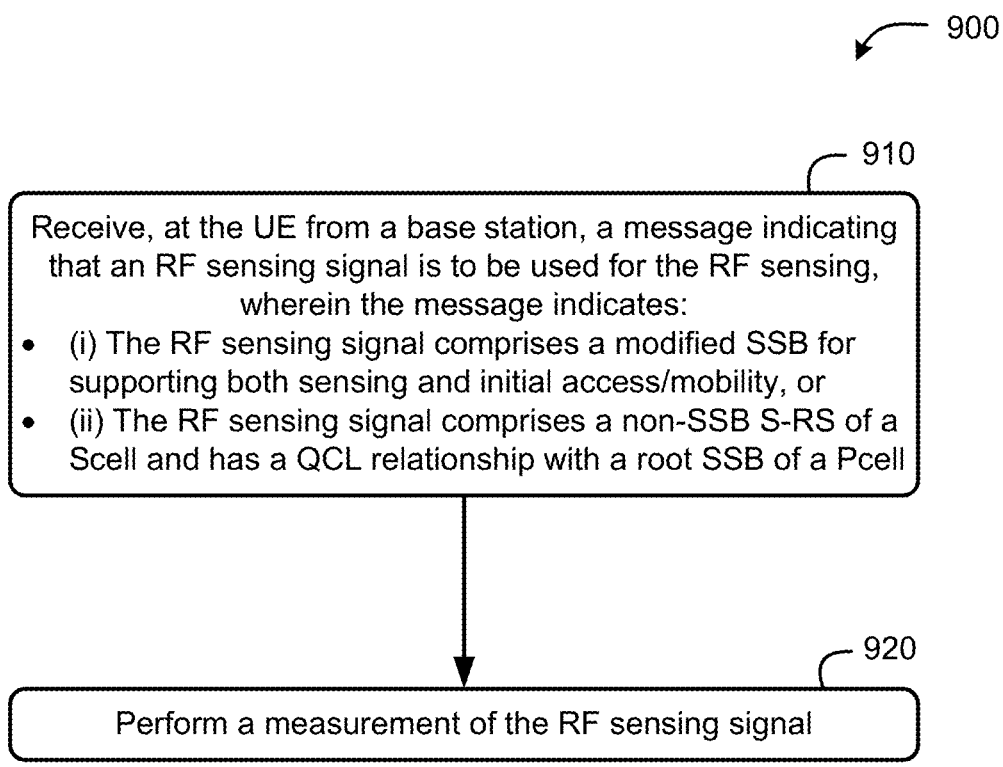
FIG. 9 is a flow diagram of a method at a UE of enabling RF sensing in a wireless communication network, according to an embodiment.

FIG. 9 is a flow diagram of a method at a UE of enabling RF sensing in a wireless communication network, according to an embodiment. In some aspects, where the method 800 of FIG. 8 may be performed by a base station, the method 900 of FIG. 9 may represent corresponding functionality at the UE. Means for performing the functionality illustrated in one or more of the blocks shown in FIG. 9 may be performed by hardware and/or software components of a UE. Example components of a UE are illustrated in FIG. 10, which is described in more detail below.

At block 910, the functionality comprises receiving, at the UE from a base station, a message indicating that an RF sensing signal is to be used for the RF sensing, wherein the message indicates: (i) the RF sensing signal comprises a modified SSB for supporting both sensing and initial access/mobility, or (ii) the RF sensing signal comprises a non-SSB S-RS of a Scell and has a QCL relationship with a root SSB of a Pcell. Again, a modified SSB for supporting both sensing and initial access/mobility may include a Class 2 SSB as previously described herein, where a Class 1 SSB may comprise a traditional (unmodified) SSB. According to some embodiments, the modified SSB may comprise an SS burst set transmitted without beam sweep, a plurality of SS burst sets in which, for each SS burst set, each SSB is transmitted using a different beam, an SS burst set in which phase continuity is guaranteed, or an SS burst set having a longer burst duration (e.g., several tens of ms, or more) than a traditional SS burst set (e.g., 5 ms), or any combination thereof.

Figure 10:
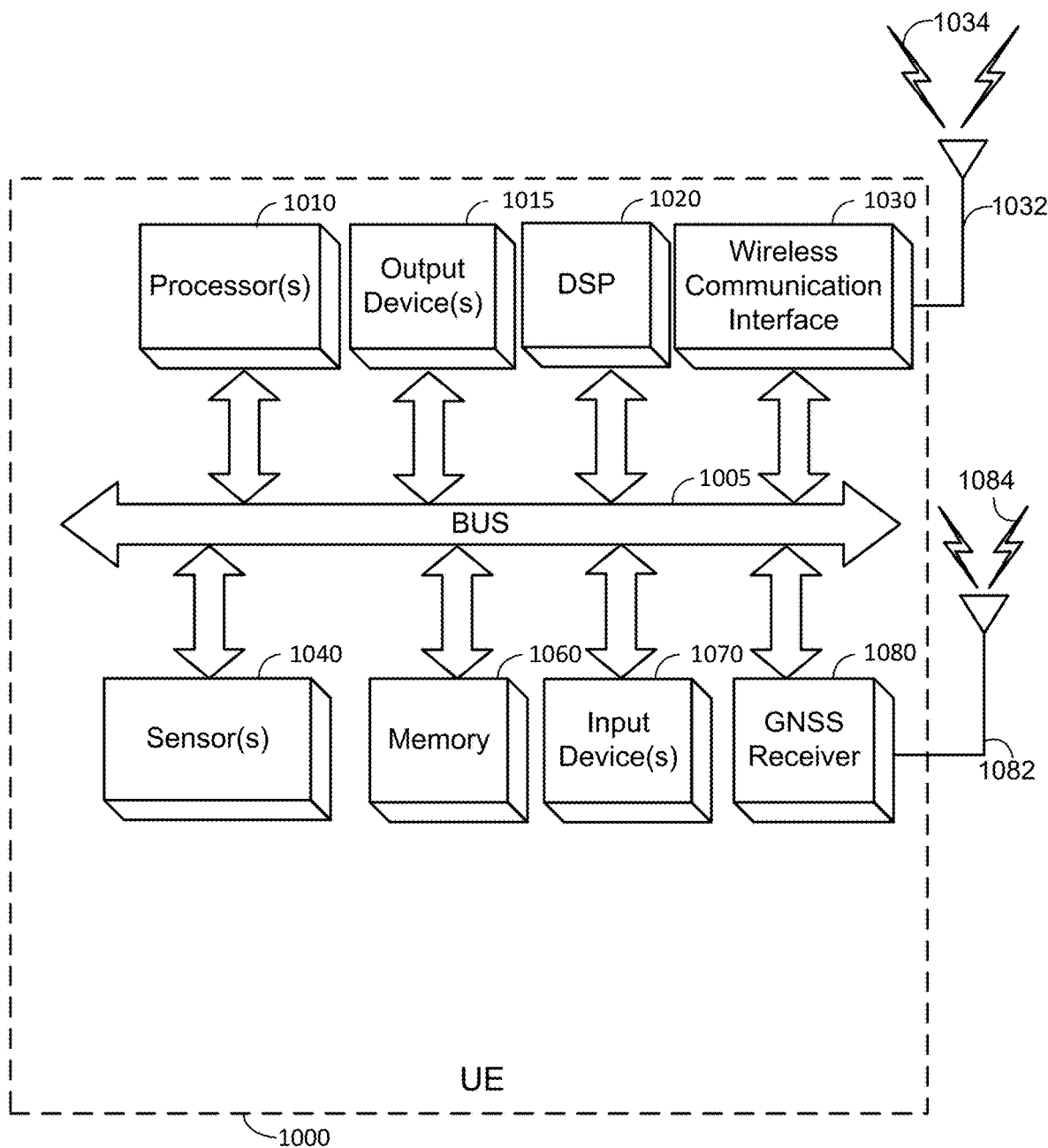
FIG. 10 is a block diagram of an embodiment of a UE.

Means for performing functionality at block 910 may comprise a bus 1005, processors 1010, DSP 1020, wireless communication interface 1030, memory 1060, and/or other components of a UE 1000, as illustrated in FIG. 10.

At block 920, the functionality comprises performing a measurement of the RF sensing signal. In particular, the UE may perform one a measurement to enable RF sensing of one or more objects, by measuring signals reflecting off the one or more objects. This can include, for example, a channel impulse response (CIR), power, and/or other measurements of the RF sensing signal (or, more precisely, reflections of the RF sensing signal off of the one or more objects) to determine the presence (and possibly range and/or distance) of the one or more objects. As such, some embodiments of the method 900 may further comprise determining the presence of one or more objects based on the measurement of the RF sensing signal. Further, as noted, the UE can report the measurements and/or RF sensing determination to another device, such as the base station or a server. As such, some embodiments of the method 900 may further comprise sending a report indicative of the presence of the one or more objects to the base station, to a server, or both. Some embodiments may further comprise sending a report indicative of the measurement to the base station, to a server, or both.

Means for performing functionality at block 920 may comprise a bus 1005, processors 1010, DSP 1020, wireless communication interface 1030, memory 1060, and/or other components of a UE 1000, as illustrated in FIG. 10.

As detailed in the embodiments provided herein, one or more additional features may be implemented, depending on desired functionality. For example, according to some embodiments in which the RF sensing signal comprises the modified SSB, the method 900 may further comprise sending a request for the modified SSB to the base station, prior to receiving the message. According to some embodiments in which the RF sensing signal comprises the S-RS, the QCL relationship with the root SSB may comprise a QCL relationship with at least one intermediary signal having a QCL relationship with the root SSB. In such embodiments, the at least one intermediary signal may comprise a periodic tracking reference signal (P-TRS). Additionally or alternatively, the at least one intermediary signal comprises a signal of the Pcell a signal of the Scell, or both.

FIG. 10 is a block diagram of an embodiment of a UE 1000, which can be utilized as described herein above (e.g., in association with the previously-described figures). It should be noted that FIG. 10 is meant only to provide a generalized illustration of various components, any or all of which may be utilized as appropriate. Furthermore, the functionality of the UE discussed herein may be executed by one or more of the hardware and/or software components illustrated in FIG. 10.

The UE 1000 is shown comprising hardware elements that can be electrically coupled via a bus 1005 (or may otherwise be in communication, as appropriate). The hardware elements may include a processor(s) 1010 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1010 may comprise one or more processing units, which may be housed in a single integrated circuit (IC) or multiple ICs. As shown in FIG. 10, some embodiments may have a separate DSP 1020, depending on desired functionality. Location determination and/or other determinations based on wireless communication may be provided in the processor(s) 1010 and/or wireless communication interface 1030 (discussed below). The UE 1000 also can include one or more input devices 1070, which can include without limitation one or more keyboards, touch screens, touch pads, microphones, buttons, dials, switches, and/or the like; and one or more output devices 1015, which can include without limitation one or more displays (e.g., touch screens), light emitting diodes (LEDs), speakers, and/or the like.

The UE 1000 may also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 1000 to communicate with other devices as described in the embodiments above. The wireless communication interface 1030 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1032 that send and/or receive wireless signals 1034. According to some embodiments, the wireless communication antenna(s) 1032 may comprise a plurality of discrete antennas, antenna arrays, or any combination thereof. The antenna(s) 1032 may be capable of transmitting and receiving wireless signals using beams (e.g., Tx beams and Rx beams). Beam formation may be performed using digital and/or analog beam formation techniques, with respective digital and/or analog circuitry. The wireless communication interface 1030 may include such circuitry.

Depending on desired functionality, the wireless communication interface 1030 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 1000 may communicate with different data networks that may comprise various network types. For example, one such network type may comprise a wireless wide area network (WWAN), which may be a code-division multiple access (CDMA) network, a time division multiple access (TDMA) network, a frequency division multiple access (FDMA) network, an orthogonal frequency division multiple access (OFDMA) network, a single-carrier frequency division multiple access (SC-FDMA) network, a WiMAX (IEEE 802.16) network, and so on. A CDMA network may implement one or more radio access technologies (RATs) such as CDMA2000®, wideband code division multiple access (WCDMA), and so on. CDMA2000® includes IS-95, IS-2000 and/or IS-856 standards. A TDMA network may implement global system for mobile communications (GSM), digital advanced mobile phone system (D-AMPS), or some other RAT. An OFDMA network may employ long-term evolution (LTE), LTE Advanced, fifth-generation (5G) new radio (NR), and so on. 5G NR, LTE, LTE Advanced, GSM, and WCDMA are described in documents from 3rd Generation Partnership Project (3GPP). CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 1000 can further include sensor(s) 1040. Sensor (s) 1040 may comprise, without limitation, one or more inertial sensors and/or other sensors (e.g., accelerometer(s), gyro scope(s), camera(s), magnetometer(s), altimeter(s), microphone(s), proximity sensor(s), light sensor(s), barometer(s), and the like), some of which may be used to obtain position-related measurements and/or other information.

Embodiments of the UE 1000 may also include a Global Navigation Satellite System (GNSS) receiver 1080 capable of receiving signals 1084 from one or more GNSS satellites using an antenna 1082 (which could be the same as antenna 1032). Positioning based on GNSS signal measurement can be utilized to complement and/or incorporate the techniques described herein. The GNSS receiver 1080 can extract a position of the UE 1000, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1080 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1080 is illustrated in FIG. 10 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1010, DSP 1020, and/or a processor within the wireless communication interface 1030 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), particle filter, or the like. The positioning engine may also be executed by one or more processors, such as processor(s) 1010 or DSP 1020.

The UE 1000 may further include and/or be in communication with a memory 1060. The memory 1060 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1060 of the UE 1000 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the UE 1000 (and/or processor(s) 1010 or DSP 1020 within UE 1000). In some embodiments, then, such code and/or instructions can be used to configure and/or adapt a general-purpose computer (or other device) to perform one or more operations in accordance with the described methods.

FIG. 11 is a block diagram of an embodiment of a base station 1100, which can be utilized as described herein above, with respect to base stations and/or Transmission Reception Point (TRPs). It should be noted that FIG. 11 is meant only to provide a generalized illustration of various components, any or all of which may be utilized as appropriate. In some embodiments, the base station 1100 may correspond to a gNB, an ng-eNB, and/or (more generally) a TRP. In some cases, a base station 1100 may comprise multiple TRPs—e.g. with each TRP associated with a different antenna or a different antenna array of the base station 1100 (e.g., 1132). As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP.

The functionality performed by a base station 1100 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. The functionality of these functional components may be performed by one or more of the hardware and/or software components illustrated in FIG. 11.

The base station 1100 is shown comprising hardware elements that can be electrically coupled via a bus 1105 (or may otherwise be in communication, as appropriate). The hardware elements may include a processor(s) 1110 which can include without limitation one or more general-purpose processors, one or more special-purpose processors (such as digital signal processor (DSP) chips, graphics acceleration processors, application-specific integrated circuits (ASICs), and/or the like), and/or other processing structure or means. As shown in FIG. 11, some embodiments may have a separate DSP 1120, depending on desired functionality. Location determination and/or other determinations based on wireless communication may be provided in the processor(s) 1110 and/or wireless communication interface 1130 (discussed below), according to some embodiments. The base station 1100 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 1100 might also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 1100 to communicate as described herein. The wireless communication interface 1130 may permit data and signaling to be communicated (e.g., transmitted and received) to UEs, other base stations/TRPs (e.g., eNBs, gNBs, and ng-eNBs), and/or other network components, computer systems, and/or other electronic devices described herein. The communication can be carried out via one or more wireless communication antenna(s) 1132 that send and/or receive wireless signals 1134. According to some embodiments, one or more wireless communication antenna(s) 1132 may comprise one or more antenna arrays, which may be capable of beamforming.

The base station 1100 may also include a network interface 1180, which can include support of wireline communication technologies. The network interface 1180 may include a modem, network card, chipset, and/or the like. The network interface 1180 may include one or more input and/or output communication interfaces to permit data to be exchanged with a network, communication network servers, computer systems, and/or any other electronic devices described herein.

In many embodiments, the base station 1100 may further comprise a memory 1160. The memory 1160 can include, without limitation, local and/or network accessible storage, a disk drive, a drive array, an optical storage device, a solid-state storage device, such as a random-access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1160 of the base station 1100 also may comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the base station 1100 (and/or processor(s) 1110 or DSP 1120 within base station 1100). In some embodiments, then, such code and/or instructions can be used to configure and/or adapt a general-purpose computer (or other device) to perform one or more operations in accordance with the described methods.

Figure 12:
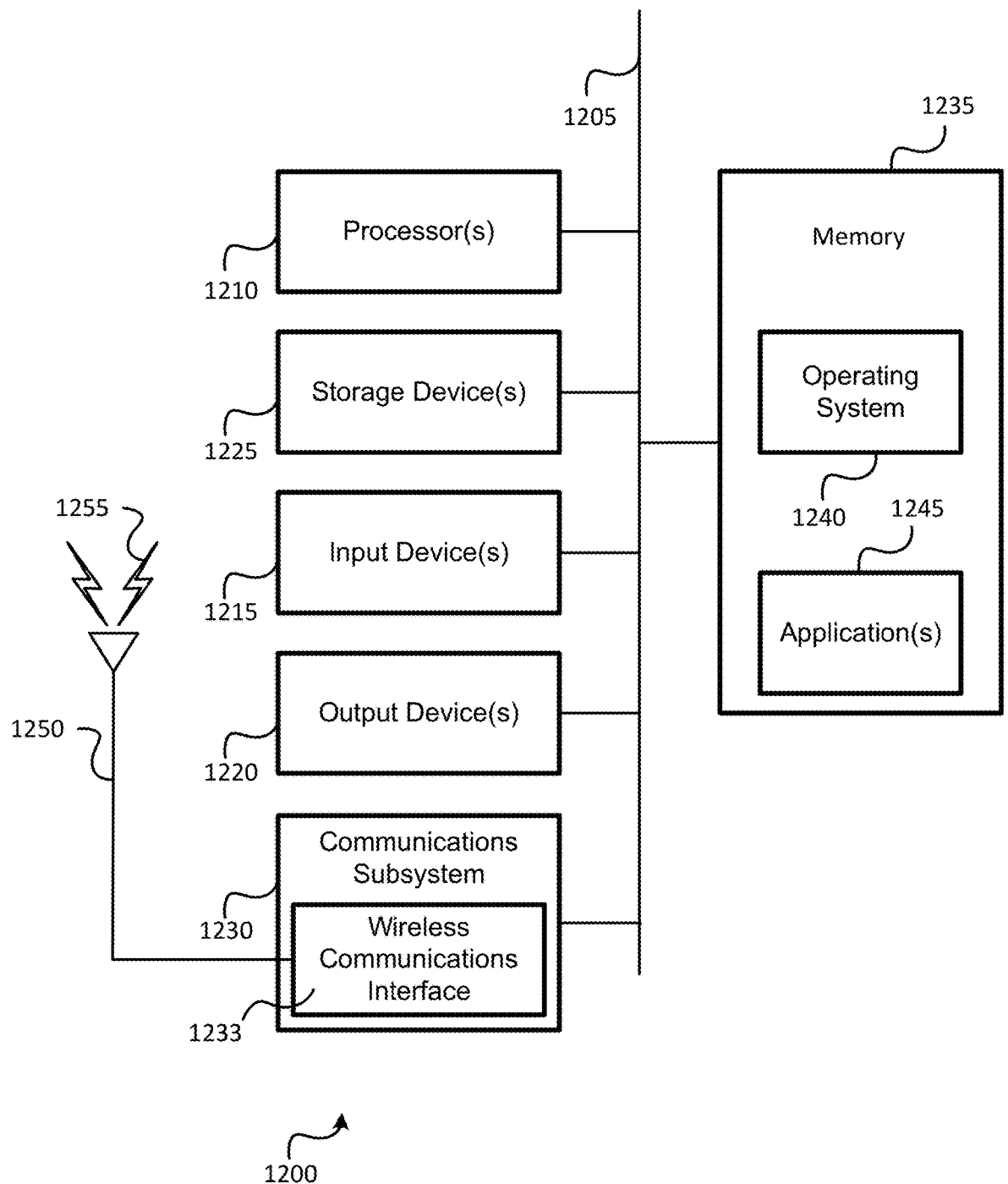
FIG. 12 is a block diagram of an embodiment of a computer system.

FIG. 12 is a block diagram of an embodiment of a computer system 1200, which may be used, in whole or in part, to provide the functions of one or more components and/or devices as described in the embodiments herein, including a server in communication with a base station and UE to coordinate RF sensing as described in embodiments herein. This may include, for example, a computer server, personal computer, personal electronic device, or the like. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner. In addition, it can be noted that components illustrated by FIG. 12 can be localized to a single device and/or distributed among various networked devices, which may be disposed at different geographical locations.

The computer system 1200 is shown comprising hardware elements that can be electrically coupled via a bus 1205 (or may otherwise be in communication, as appropriate). The hardware elements may include processor(s) 1210, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1200 also may comprise one or more input devices 1215, which may comprise without limitation a mouse, a keyboard, a camera, a microphone, and/or the like; and one or more output devices 1220, which may comprise without limitation a display device, a printer, and/or the like.

The computer system 1200 may further include (and/or be in communication with) one or more non-transitory storage devices 1225, which can comprise, without limitation, local and/or network accessible storage, and/or may comprise, without limitation, a disk drive, a drive array, an optical storage device, a solid-state storage device, such as a random-access memory (RAM) and/or read-only memory (ROM), which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1200 may also include a communications subsystem 1230, which may comprise wireless communication technologies managed and controlled by a wireless communication interface 1233, as well as wired technologies (such as Ethernet, coaxial communications, universal serial bus (USB), and the like). The wireless communication interface 1233 may comprise one or more wireless transceivers that may send and receive wireless signals 1255 (e.g., signals according to 5G NR or LTE) via wireless antenna(s) 1250. Thus the communications subsystem 1230 may comprise a modem, a network card (wireless or wired), an infrared communication device, a wireless communication device, and/or a chipset, and/or the like, which may enable the computer system 1200 to communicate on any or all of the communication networks described herein to any device on the respective network, including a User Equipment (UE), base stations and/or other transmission reception points (TRPs), and/or any other electronic devices described herein. Hence, the communications subsystem 1230 may be used to receive and send data as described in the embodiments herein.

In many embodiments, the computer system 1200 will further comprise a working memory 1235, which may comprise a RAM or ROM device, as described above. Software elements, shown as being located within the working memory 1235, may comprise an operating system 1240, device drivers, executable libraries, and/or other code, such as one or more applications 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method at a base station of enabling radiofrequency (RF) sensing in a wireless communication network, the method comprising: sending, from the base station to a user equipment (UE), a message indicating that an RF sensing signal is to be used for the RF sensing, wherein the message indicates: the RF sensing signal comprises a modified synchronization signal block (SSB) for supporting both sensing and initial access/mobility, or the RF sensing signal comprises a non-SSB sensing reference signal (S-RS) of a secondary cell (Scell) and has a quasi co-location (QCL) relationship with a root SSB of a primary cell (Pcell); and transmitting the RF sensing signal.

Clause 2. The method of clause 1, wherein the modified SSB comprises: an SS burst set transmitted without beam sweep, a plurality of SS burst sets in which, for each SS burst set, each SSB is transmitted using a different beam, an SS burst set in which phase continuity is guaranteed, or an SS burst set having a longer burst duration than a traditional SS burst set, or any combination thereof.

Clause 3. The method of any one of clauses 1-2 wherein the RF sensing signal comprises the modified SSB, and sending the RF transmitting signal is responsive to receiving, at the base station from the UE, a request for the modified SSB.

Clause 4. The method of any one of clauses 1-2 wherein the RF sensing signal comprises the S-RS, and wherein the QCL relationship with the root SSB comprises a QCL relationship with at least one intermediary signal having a QCL relationship with the root SSB.

Clause 5. The method of clause 4 wherein the at least one intermediary signal comprises a periodic tracking reference signal (P-TRS).

Clause 6. The method of any one of clauses 4-5 wherein the at least one intermediary signal comprises a signal of the Pcell, a signal of the Scell, or both.

Clause 7. A method at a user equipment (UE) of enabling radiofrequency (RF) sensing in a wireless communication network, the method comprising: receiving, at the UE from a base station, a message indicating that an RF sensing signal is to be used for the RF sensing, wherein the message indicates: the RF sensing signal comprises a modified synchronization signal block (SSB) for supporting both sensing and initial access/mobility, or the RF sensing signal comprises a non-SSB sensing reference signal (S-RS) of a secondary cell (Scell) and has a quasi co-location (QCL) relationship with a root SSB of a primary cell (Pcell); and performing a measurement of the RF sensing signal.

Clause 8. The method of clause 7, further comprising determining the presence of one or more objects based on the measurement of the RF sensing signal.

Clause 9. The method of clause 8, further comprising sending a report indicative of the presence of the one or more objects to the base station, to a server, or both.

Clause 10. The method of clause 7, further comprising sending a report indicative of the measurement to the base station, to a server, or both.

Clause 11. The method of any one of clauses 7-10 wherein the modified SSB comprises: an SS burst set transmitted without beam sweep, a plurality of SS burst sets in which, for each SS burst set, each SSB is transmitted using a different beam, an SS burst set in which phase continuity is guaranteed, or an SS burst set having a longer burst duration than a traditional SS burst set, or any combination thereof.

Clause 12. The method of any one of clauses 7-11 wherein the RF sensing signal comprises the modified SSB, and wherein the method further comprises sending a request for the modified SSB to the base station, prior to receiving the message.

Clause 13. The method of any one of clauses 7-11 wherein the RF sensing signal comprises the S-RS, and wherein the QCL relationship with the root SSB comprises a QCL relationship with at least one intermediary signal having a QCL relationship with the root SSB.

Clause 14. The method of clause 13 wherein the at least one intermediary signal comprises a periodic tracking reference signal (P-TRS).

Clause 15. The method of any one of clauses 13-14 wherein the at least one intermediary signal comprises a signal of the Pcell, a signal of the Scell, or both.

Clause 16. A base station for enabling radiofrequency (RF) sensing in a wireless communication network, the base station comprising: a transceiver; a memory; and one or more processors communicatively coupled with the transceiver and the memory, wherein the one or more processors are configured to: send, via the transceiver to a user equipment (UE), a message indicating that an RF sensing signal is to be used for the RF sensing, wherein the message indicates: the RF sensing signal comprises a modified synchronization signal block (SSB) for supporting both sensing and initial access/mobility, or the RF sensing signal comprises a non-SSB sensing reference signal (S-RS) of a secondary cell (Scell) and has a quasi co-location (QCL) relationship with a root SSB of a primary cell (Pcell); and transmit the RF sensing signal via the transceiver.

Clause 17. The base station of clause 16, wherein the one or more processors are configured to include, in the modified SSB: an SS burst set transmitted without beam sweep, a plurality of SS burst sets in which, for each SS burst set, each SSB is transmitted using a different beam, an SS burst set in which phase continuity is guaranteed, or an SS burst set having a longer burst duration than a traditional SS burst set, or any combination thereof.

Clause 18. The base station of any one of clauses 16-17 wherein the one or more processors are configured to send the RF transmitting signal responsive to receiving, via the transceiver from the UE, a request for the modified SSB.

Clause 19. The base station of any one of clauses 16-17 wherein the one or more processors are configured to include, in the message, and indication the QCL relationship with the root SSB comprises a QCL relationship with at least one intermediary signal having a QCL relationship with the root SSB.

Clause 20. The base station of clause 19 wherein the one or more processors are configured to indicate the at least one intermediary signal comprises a periodic tracking reference signal (P-TRS).

Clause 21. The base station of any one of clauses 19-20 wherein the one or more processors are configured to indicate the at least one intermediary signal comprises a signal of the Pcell, a signal of the Scell, or both.

Clause 22. A user equipment (UE) for enabling radiofrequency (RF) sensing in a wireless communication network, the UE comprising: a transceiver; a memory; and one or more processors communicatively coupled with the transceiver and the memory, wherein the one or more processors are configured to: receive, via the transceiver from a base station, a message indicating that an RF sensing signal is to be used for the RF sensing, wherein the message indicates: the RF sensing signal comprises a modified synchronization signal block (SSB) for supporting both sensing and initial access/mobility, or the RF sensing signal comprises a non-SSB sensing reference signal (S-RS) of a secondary cell (Scell) and has a quasi co-location (QCL) relationship with a root SSB of a primary cell (Pcell); and perform a measurement of the RF sensing signal.

Clause 23. The UE of clause 22, wherein the one or more processors are further configured to determine the presence of one or more objects based on the measurement of the RF sensing signal.

Clause 24. The UE of clause 23, wherein the one or more processors are further configured to send a report indicative of the presence of the one or more objects to the base station, to a server, or both.

Clause 25. The UE of clause 22, wherein the one or more processors are further configured to send a report indicative of the measurement to the base station, to a server, or both.

Clause 26. The UE of any one of clauses 22-25 wherein the one or more processors are configured to receive, in the modified SSB: an SS burst set transmitted without beam sweep, a plurality of SS burst sets in which, for each SS burst set, each SSB is transmitted using a different beam, an SS burst set in which phase continuity is guaranteed, or an SS burst set having a longer burst duration than a traditional SS burst set, or any combination thereof.

Clause 27. The UE of any one of clauses 22-26 wherein the one or more processors are configured to send a request for the modified SSB to the base station, prior to receiving the message.

Clause 28. The UE of any one of clauses 22-26 wherein the one or more processors are configured to receive an indication the RF sensing signal comprises the S-RS and the QCL relationship with the root SSB comprises a QCL relationship with at least one intermediary signal having a QCL relationship with the root SSB.

Clause 29. The UE of clause 28 wherein the one or more processors are configured to receive an indication the at least one intermediary signal comprises a periodic tracking reference signal (P-TRS).

Clause 30. The UE of any one of clauses 28-29 wherein the one or more processors are configured to receive an indication the at least one intermediary signal comprises a signal of the Pcell, a signal of the Scell, or both.

Clause 31. An apparatus having means for performing the method of any one of clauses 1-15.

Clause 32. A non-transitory computer-readable medium storing instructions, the instructions comprising code for performing the method of any one of clauses 1-15.

What is claimed is:

1. A method at a base station of enabling radiofrequency (RF) sensing in a wireless communication network, the method comprising:
    sending, from the base station to a user equipment (UE), a message indicating that an RF sensing signal is to be used for the RF sensing, wherein the message indicates:
        (i) the RF sensing signal comprises a modified synchronization signal block (SSB) for supporting both sensing and initial access/mobility, or
        (ii) the RF sensing signal comprises a non-SSB sensing reference signal (S-RS) of a secondary cell (Scell) and has a quasi co-location (QCL) relationship with a root SSB of a primary cell (Pcell); and
    transmitting the RF sensing signal.

2. The method of claim 1, wherein the modified SSB comprises:
    an SS burst set transmitted without beam sweep,
    a plurality of SS burst sets in which, for each SS burst set, each SSB is transmitted using a different beam,
    an SS burst set in which phase continuity is guaranteed, or
    an SS burst set having a longer burst duration than a traditional SS burst set, or
    any combination thereof.

3. The method of claim 1, wherein the RF sensing signal comprises the modified SSB, and sending the RF transmitting signal is responsive to receiving, at the base station from the UE, a request for the modified SSB.

4. The method of claim 1, wherein the RF sensing signal comprises the S-RS, and wherein the QCL relationship with the root SSB comprises a QCL relationship with at least one intermediary signal having a QCL relationship with the root SSB.

5. The method of claim 4, wherein the at least one intermediary signal comprises a periodic tracking reference signal (P-TRS).

6. The method of claim 4, wherein the at least one intermediary signal comprises a signal of the Pcell, a signal of the Scell, or both.

7. A method at a user equipment (UE) of enabling radiofrequency (RF) sensing in a wireless communication network, the method comprising:
    receiving, at the UE from a base station, a message indicating that an RF sensing signal is to be used for the RF sensing, wherein the message indicates:
        (i) the RF sensing signal comprises a modified synchronization signal block (SSB) for supporting both sensing and initial access/mobility, or
        (ii) the RF sensing signal comprises a non-SSB sensing reference signal (S-RS) of a secondary cell (Scell) and has a quasi co-location (QCL) relationship with a root SSB of a primary cell (Pcell); and
    performing a measurement of the RF sensing signal.

8. The method of claim 7, further comprising determining the presence of one or more objects based on the measurement of the RF sensing signal.

9. The method of claim 8, further comprising sending a report indicative of the presence of the one or more objects to the base station, to a server, or both.

10. The method of claim 7, further comprising sending a report indicative of the measurement to the base station, to a server, or both.

11. The method of claim 7, wherein the modified SSB comprises:
    an SS burst set transmitted without beam sweep,
    a plurality of SS burst sets in which, for each SS burst set, each SSB is transmitted using a different beam,
    an SS burst set in which phase continuity is guaranteed, or
    an SS burst set having a longer burst duration than a traditional SS burst set, or
    any combination thereof.

12. The method of claim 7, wherein the RF sensing signal comprises the modified SSB, and wherein the method further comprises sending a request for the modified SSB to the base station, prior to receiving the message.

13. The method of claim 7, wherein the RF sensing signal comprises the S-RS, and wherein the QCL relationship with the root SSB comprises a QCL relationship with at least one intermediary signal having a QCL relationship with the root SSB.

14. The method of claim 13, wherein the at least one intermediary signal comprises a periodic tracking reference signal (P-TRS).

15. The method of claim 13, wherein the at least one intermediary signal comprises a signal of the Pcell, a signal of the Scell, or both.

16. A base station for enabling radiofrequency (RF) sensing in a wireless communication network, the base station comprising:
a transceiver;
a memory; and
one or more processors communicatively coupled with the transceiver and the memory, wherein the one or more processors are configured to:
send, via the transceiver to a user equipment (UE), a message indicating that an RF sensing signal is to be used for the RF sensing, wherein the message indicates:
the RF sensing signal comprises a modified synchronization signal block (SSB) for supporting both sensing and initial access/mobility, or
the RF sensing signal comprises a non-SSB sensing reference signal (S-RS) of a secondary cell (Scell) and has a quasi co-location (QCL) relationship with a root SSB of a primary cell (Pcell); and
transmit the RF sensing signal via the transceiver.

17. The base station of claim 16, wherein the one or more processors are configured to include, in the modified SSB:
an SS burst set transmitted without beam sweep,
a plurality of SS burst sets in which, for each SS burst set, each SSB is transmitted using a different beam,
an SS burst set in which phase continuity is guaranteed, or
an SS burst set having a longer burst duration than a traditional SS burst set, or
any combination thereof.

18. The base station of claim 16, wherein the one or more processors are configured to send the RF transmitting signal responsive to receiving, via the transceiver from the UE, a request for the modified SSB.

19. The base station of claim 16, wherein the one or more processors are configured to include, in the message, and indication the QCL relationship with the root SSB comprises a QCL relationship with at least one intermediary signal having a QCL relationship with the root SSB.

20. The base station of claim 19, wherein the one or more processors are configured to indicate the at least one intermediary signal comprises a periodic tracking reference signal (P-TRS).

21. The base station of claim 19, wherein the one or more processors are configured to indicate the at least one intermediary signal comprises a signal of the Pcell, a signal of the Scell, or both.

22. A user equipment (UE) for enabling radiofrequency (RF) sensing in a wireless communication network, the UE comprising:
a transceiver;
a memory; and
one or more processors communicatively coupled with the transceiver and the memory, wherein the one or more processors are configured to:
receive, via the transceiver from a base station, a message indicating that an RF sensing signal is to be used for the RF sensing, wherein the message indicates:
the RF sensing signal comprises a modified synchronization signal block (SSB) for supporting both sensing and initial access/mobility, or
the RF sensing signal comprises a non-SSB sensing reference signal (S-RS) of a secondary cell (Scell) and has a quasi co-location (QCL) relationship with a root SSB of a primary cell (Pcell); and
perform a measurement of the RF sensing signal.

23. The UE of claim 22, wherein the one or more processors are further configured to determine the presence of one or more objects based on the measurement of the RF sensing signal.

24. The UE of claim 23, wherein the one or more processors are further configured to send a report indicative of the presence of the one or more objects to the base station, to a server, or both.

25. The UE of claim 22, wherein the one or more processors are further configured to send a report indicative of the measurement to the base station, to a server, or both.

26. The UE of claim 22, wherein the one or more processors are configured to receive, in the modified SSB:
an SS burst set transmitted without beam sweep,
a plurality of SS burst sets in which, for each SS burst set, each SSB is transmitted using a different beam,
an SS burst set in which phase continuity is guaranteed, or
an SS burst set having a longer burst duration than a traditional SS burst set, or
any combination thereof.

27. The UE of claim 22, wherein the one or more processors are configured to send a request for the modified SSB to the base station, prior to receiving the message.

28. The UE of claim 22, wherein the one or more processors are configured to receive an indication the RF sensing signal comprises the S-RS and the QCL relationship with the root SSB comprises a QCL relationship with at least one intermediary signal having a QCL relationship with the root SSB.

29. The UE of claim 28, wherein the one or more processors are configured to receive an indication the at least one intermediary signal comprises a periodic tracking reference signal (P-TRS).

30. The UE of claim 28, wherein the one or more processors are configured to receive an indication the at least one intermediary signal comprises a signal of the Pcell, a signal of the Scell, or both.

* * * * *